United States Patent Office 3,423,990
Patented Jan. 28, 1969

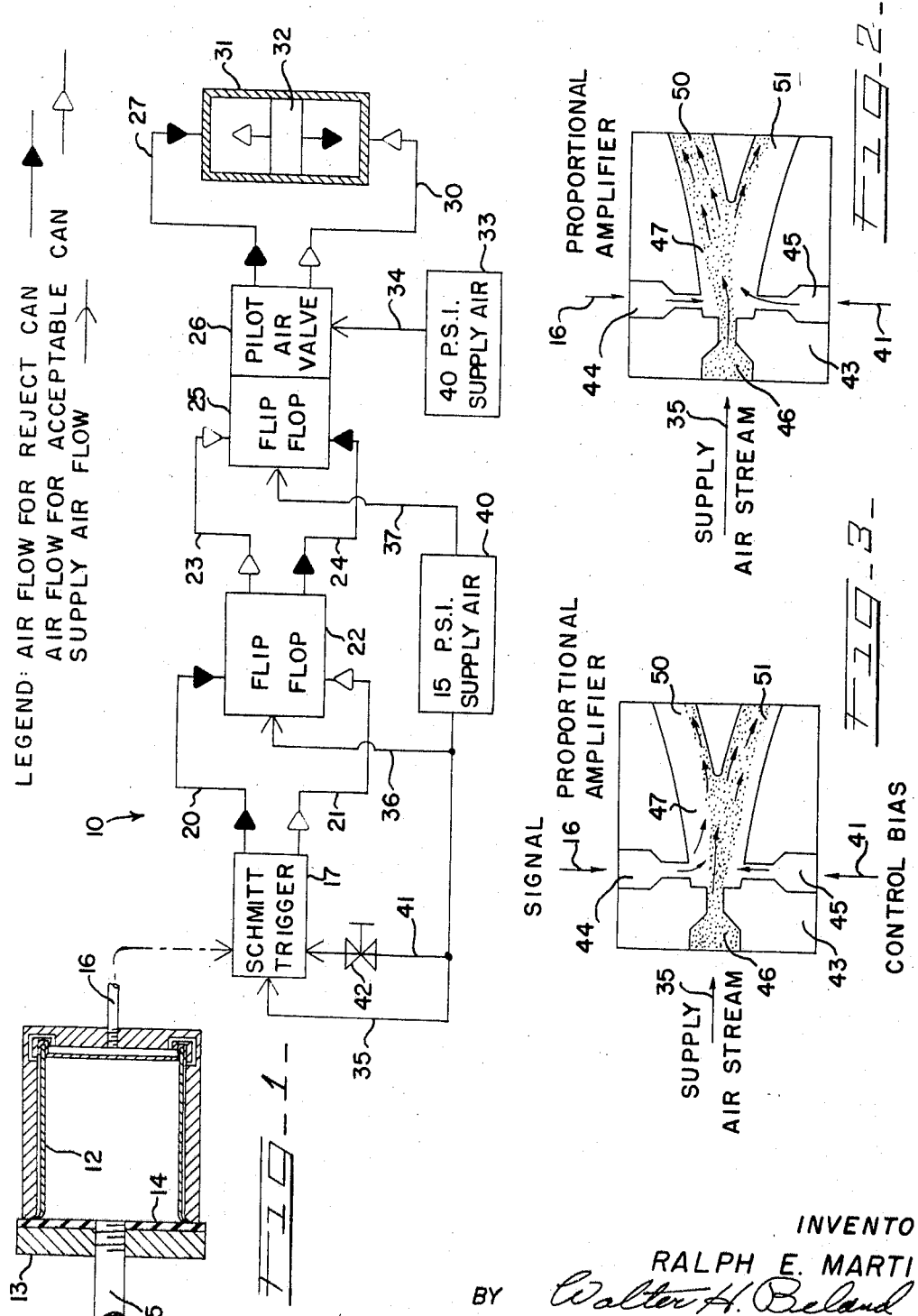

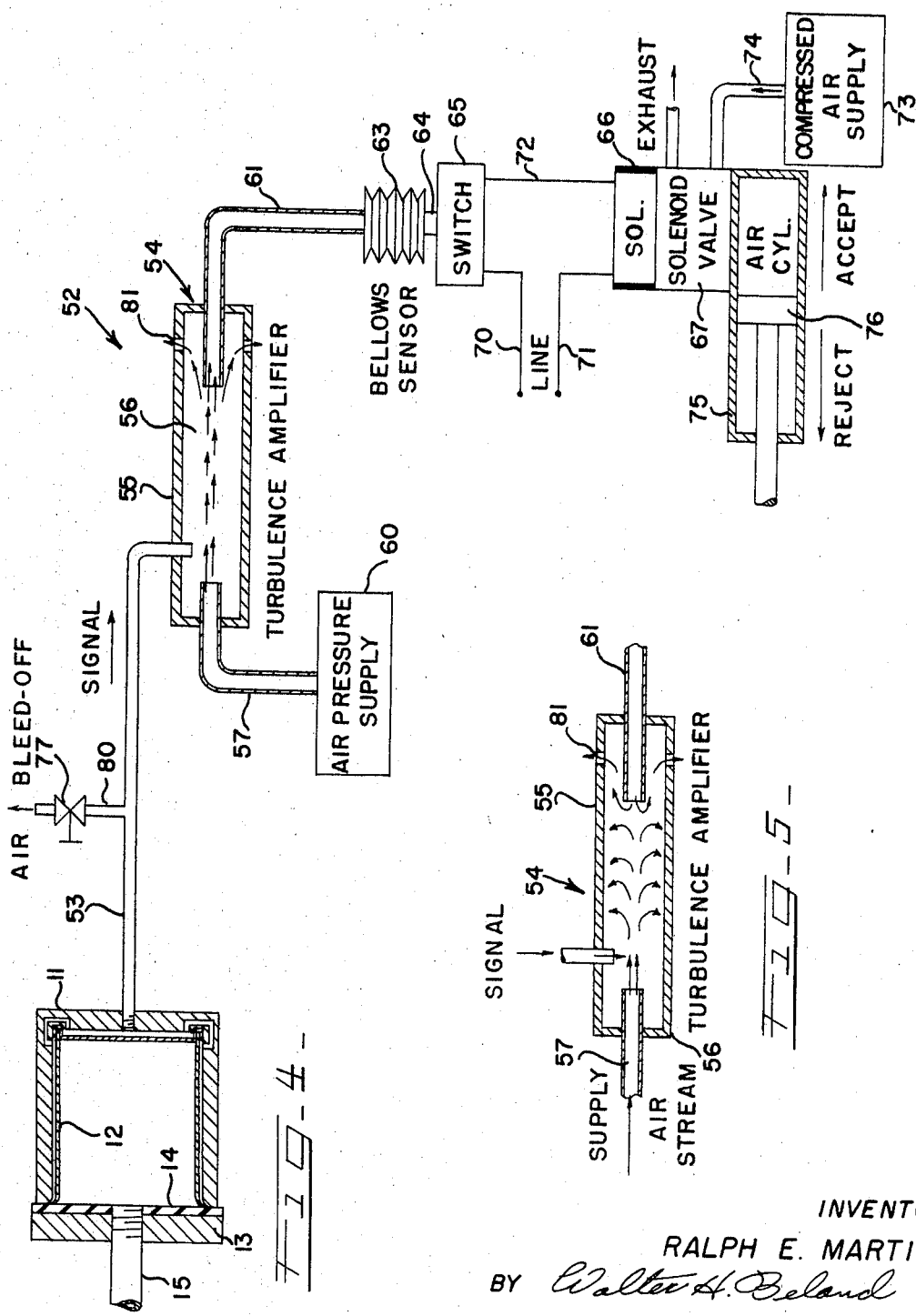

3,423,990
APPARATUS AND METHOD FOR DETECTING LEAKY CANS
Ralph E. Martin, Oak Lawn, Ill., assignor to Continental Can Company, Inc., New York, N.Y., a corporation of New York
Filed July 25, 1967, Ser. No. 655,946
U.S. Cl. 73—45.1                3 Claims
Int. Cl. G01m 3/04

ABSTRACT OF THE DISCLOSURE

An apparatus for detecting leaky cans which includes a test chamber into which a can is placed. The can interior is filled with air under pressure. If the can has a leak, air will leak out into the chamber to increase the pressure in the chamber. A tube is connected to the chamber through which the leakage air flows from the chamber. The tube is connected to the control port of a fluidic amplifier to provide a signal to the amplifier in the form of the leakage air stream. The fluid signal is amplified by the fluidic amplifier and the amplified fluid signal is used to operate a reject device to reject the leaky can.

The method includes the steps of forming a signal stream of the air leaking from the can; directing the signal stream against a signal amplifying stream of air to cause a change in the amplifying stream and employing the change in the amplifying stream as a signal to operate the reject device.

BACKGROUND OF THE INVENTION

Field of the invention

The invention is in the general field of testing containers for leaks. More specifically, the invention relates to the testing of cans for leaks. The usual can has a side-seam that is either bonded together and sealed by means of solder or a non-metallic sealing compound. The ends are joined to the can body by means of the common double-seam which is sealed tight by means of a sealing compound. Occasionally, although very infrequently, due to faulty manufacture, a leak will be present in one of the seams of the can. There is also the possibility that a pin hole may be present in the sheet metal from which the can is constructed through which leakage could occur.

It is very important that any such leaky containers be detected during manufacturing operations and rejected as such. Toward this end high speed air testing machines were developed and have been used in can plants for many years. With constantly increasing production speeds and the desire for increasingly higher product quality, these machines have been improved over the years.

The invention has specific application in such machines and affords an improved leak detecting system and leaky can rejecting means.

Description of the prior art

A well known type of leaky can detecting machine or air tester as such a machine is commonly referred to in the industry is described in U.S. Patent Nos. 2,013,402 and 2,013,403 issued Sept. 3, 1935 and No. 2,020,535 issued Nov. 12, 1935 on the inventions of William Cameron. In this type of machine, each can of a series is successively subjected internally or externally to air under pressure. Any leakage through the walls or seams of the can is used to actuate a relay which diverts the defective can from the normal discharge path of those found to be satisfactorily air-tight. Certain limitations have been observed in the speed at which the successive cans may be tested and the minimum volume of air leakage that must be present in order to actuate the means for subsequently separating the defective cans.

One approach to increasing the test speed and accuracy is taught in U.S. Patent No. 2,645,117 issued on July 14, 1953 to Gordon H. Bendix and Calvin R. Breden. This invention utilizes the well known principle that a flow of gas, as for example, leakage air, over a heated resistor having a temperature coefficient can be employed to cause a Wheatstone bridge to go from a state of balance to a state of unbalance. Although on a theoretical basis this invention represented an advance in the art, for various practical reasons, it never supplanted the leak detecting systems of the referred to Cameron machine patents.

In the Cameron patent teachings, either single or double diaphragms are employed. The can to be tested is placed in a chamber and the open mouth rim of the can is held tightly by a plunger against a rubber pad so that the can is sealed within the chamber. Air pressure is then placed in communication with either the can interior or the can exterior so that in the one case air leakage will flow from the can into the chamber, or in the other case from the chamber into the can. As the case may be, either the chamber or the interior of the can is communicated with a diaphragm or diaphragms the deflection of which is employed to operate an electrical contact or contacts to energize a circuit which is effective to operate a reject mechanism to dispose of a leaking can.

Such leak detecting arrangements have certain disadvantages. One disadvantage is that it requires a relatively great amount of time for the leakage air to deflect the diaphragm or diaphragms sufficiently to operate the electrical contacts. This, of course, limits the speed at which the testing machine can operate. Another disadvantage is that there is always a certain minimum of air leakage between the rim defining the can mouth and the rubber pad against which it seats which results in a certain amount of deflection of the diaphragm or diaphragms employed during the testing of each can regardless of whether the can is or is not a leaker. Such constant deflection of the diaphragm or diaphragms shortens their life so that they have to be replaced from time to time.

Another deficiency which occurs in each of the four discussed patents is that the reject mechanism for a leaky can is ultimately operated by a solenoid. Although solenoid operated reject mechanisms work satisfactorily at average production speeds, the solenoid becomes erratic at extremely high operating speeds. The solenoid of the reject mechanism, therefore, is a limiting factor of the prior art teachings relative to increasing the machine's operating speed. Another fault of the air testing machines employing diaphragms or bellows type sensors is in properly adjusting the electrical contacts with respect to the diaphragm or bellows for accurate operation thereby. In many applications it is not necessary that the cans be absolutely air-tight, and it is therefore necessary that the testing machine be capable of discriminating between an acceptable leaker and a non-acceptable leaker. In such case, the positioning of the contacts with respect to the diaphragm or bellows becomes very critical and is difficult to make and maintain.

With respect to the aforesaid Bendix et al. patent which employs a heated resistor that is cooled by air leakage through a can so as to unbalance a bridge circuit it will be apparent that the cooling of the resistance element takes a certain amount of time which tends to limit the speed of response. After the temperature sensitive element has been subjected to cooling air-flow through a leaking can some time is required for it to again to return to its normal temperature which is also a limiting factor with respect to the rate at which the machine can be operated.

In a preferred form of the invention the discussed problems found in the prior art devices have either been wholely or greatly eliminated. In accordance with the invention, it is not necessary to use a diaphrgam or bellows to operate electrical contacts with their attendant adjustment problem, nor is it necessary in the preferred embodiment to employ the speed limiting solenoid actuated reject device common to the prior art. It is furthermore not even necessary to employ any electrical means in the detection system, which greatly simplifies the operation and maintenance. The invention in either its preferred or a simplified form does not require any time consuming and speed limiting heating or cooling operations in its detection system. Furthermore, in accordance with the invention, very high leak detecting sensitivity is achieved, and the sensitivity is easily controlled by means of a very simple adjustment. The invention utilizes the principle of interacting air streams in its detecting system which results in a unique method of detecting leaking cans and in operating a reject air cylinder that is not taught in the above discussed prior art patents or in any other known patents.

SUMMARY OF THE INVENTION

In accordance with the invention, a tube is connected to the individual test chamber of the air testing machine through which leakage air that leaks through a leaky can under test in the chamber flows. The leakage is directed into a fluidic amplifier in the form of a signal stream of air. Also directed into the fluidic amplifier is a supply stream of air. In the amplifier interaction occurs between the signal air stream and the supply air stream which results in some change occurring in the resulting air-flow pattern within the amplifier that is in amplified proportion to the signal input flow from the test chamber. The intensity of the leakage or signal air flow into the fluidic amplifier is best used to modulate the supply air stream which is usually more powerful, to change a quality or condition of the supply stream that is proportional to the interactional force between the streams which results in the modulation of the supply stream by the signal stream. The modulation of the supply air stream may consist of changing its direction so that it flows through one passageway or another passageway of the amplifier depending upon whether sufficient can leakage air-flow signal is present to cause the supply stream to be diverted from said one passageway to the other by interaction with the signal air-flow. Another form of modulation that may be employed is to normally have the supply stream split up so that half of the supply stream is diverted into one passageway of the amplifier and the other half is diverted into another passageway when little or no signal air is delivered from the test chamber through a can. When a signal is delivered and interacts with the supply stream, it causes the supply stream to be diverted so that more air will flow through one of the passageways than the other in proportion to the size of the leak in the can and consequent intensity of the signal air stream to the amplifier.

Still another means that may be employed to modulate the supply stream in proportion to the intensity of the signal stream is by having the interaction of the supply stream and signal stream result in the supply stream flow pattern being changed from a laminar flow pattern to a substantially turbulent flow pattern when the strength of the signal stream is increased to a predetermined level.

In the preferred form on the invention, the supply stream is normally divided so as to flow between two passageways in a fluidic proportional amplifier. The signal air stream flow which is in proportion to the size of the leak in the can is employed to change the proportion of air flowing in the two passageways by its interaction with the supply stream. The change in the diverting of the supply stream in the two passageways results in a considerable signal amplification which is preferably further amplified to a desired or necessary level for subsequent operation of a reject device if the signal level is sufficiently high to indicate a defectively leaky container or can.

By further purely fluidic processing, a detected signal input of sufficient intensity to indicate a defectively leaking can is converted into digital fluid logic which is employed to control a fluidically operated pilot air valve through the operation of a fluidic flip-flop associated with the pilot air valve. The pilot air valve controls the operation of the reject device operating air cylinder.

In a simplified form of the invention which may be used as a kit to improve existing can testing machines some of the previously employed testing system components may be used while still obtaining many of the advantages of the immediately above described purely fluidic detecting and rejecting system.

In a preferred form such a kit provides a turbulent type amplifier that connects to the leakage air flow tube from the test chamber. A constant supply air stream is provided through a tube into the turbulence amplifier. The supply air stream is essentially a laminar flow and it normally flows across a gap into a collector tube that is in axial alignment with the supply stream. The collector tube connects into the usual diaphragm or bellows type air pressure sensing device of the machine which may still be used. The contacts or switch operated by the diaphragm or bellows also may be used as well as the solenoid operated rejecting device.

In operation, the supply stream in essentially laminar flow form, passes constantly into the collector tube and causes the diaphragm or bellows to be moved to a position where the switch associated therewith is caused to be held open. As long as no defectively leaky cans are encountered there will be insufficient signal air flowing from the test chamber into the turbulence amplifier to sufficiently interact with the supply stream to cause the supply stream to break up and become turbulent. The major portion of the laminar flow supply stream, therefore in such case, will continue to pass into the collector tube and maintain the diaphragm or bellows sensor in a constant position at which the switch remains held open. However, when a leaky container or can having a leak of sufficient magnitude to render the can defective is in the test chamber, sufficient air will leak from the test chamber through the tube connecting the test chamber with the turbulence amplifier to increase the magnitude of the signal stream to such an extent that its interaction with the supply stream results in the supply stream breaking into turbulent flow. The breaking up of the supply stream results in little or no air pressure being exerted through the end of the collector tube on the diaphragm or bellows sensor which causes the diaphragm or bellows sensor to assume a normal unflexed position at which the switch is allowed to assume a closed position. The closing of the switch results in energizing of the solenoid and subsequent rejecting of the detected defectively leaky can.

The provision of apparatus of the types above described and as will be more fully described later in detail represents the main objects of the invention.

A further and perhaps equally important object of the invention is the provision of a method of testing containers for leaks which includes the steps of subjecting a container to differential fluid pressure between the interior and exterior thereof; forming a first stream of fluid leaking through the container; providing a second stream of fluid; interacting the first stream with the second stream so as to modify the second stream, and utilizing the modification of the second stream as a leaky container signal.

Other objects, advantages and uses of the invention will become apparent upon reference to the drawings and following detailed description of preferred embodiments.

BRIEF DESCRIPTION OF THE DRAWINGS

FIGURE 1 is a schematic representation of a preferred form of the invention;

FIGURE 2 is an enlarged fragmentary view taken through the input proportional amplifier of the Schmitt trigger, of FIGURE 1 and showing the air flow pattern existing when a satisfactory can is under test;

FIGURE 3 is a view similar to FIGURE 2 but showing the air flow pattern that exists when a defectively leaky can is under test;

FIGURE 4 is a schematic representation of an alternate apparatus employing a turbulence amplifier and showing the air flow pattern when an acceptable can is being tested; and, FIGURE 5 is a sectional view through the turbulence amplifier of FIGURE 4 showing the operation thereof when a reject signal is received thereby.

DESCRIPTION OF THE PREFERRED EMBODIMENT

In FIGURE 1 the apparatus in accordance with the invention is generally indicated by the numeral 10 in its preferred form and includes a test chamber 11 in which an empty can 12 is positioned for leak testing purposes. A movable suction head 13 is provided and includes a rubber sealing pad 14 which seals against the open end rim of the chamber 11 and against the rim of the can mouth. Compressed air may be admitted into the interior of the can 12 through a tube 15 to pressurize the can. A second tube 16 communicates with the test chamber 11 and receives air that leaks from within the confines of the can. The chamber 11 and movable suction head 13 are preferably components of one of the many testing stations employed in a can testing machine of the general type described in the previously discussed Cameron patents and the patent to G. H. Bendix et al. Tube 16 is connected to a fluidic Schmitt trigger device 17. Schmitt trigger device 17 has a pair of output tubes 20 and 21 through which signals are delivered to a power flip-flop 22. Flip-flop 22 likewise has a pair of output tubes 23 and 24 through which signals are delivered to a flip-flop 25 which is integrally connected to and delivers control signals to a pilot air valve 26. A pair of signal output tubes from the pilot air valve indicated at 27 and 30 are connected to opposite ends of an air cylinder 31 having a movable piston 32 therein.

A supply of compressed air indicated at 33 which may, for example, be in the neighborhood of 40 p.s.i. is delivered to the pilot air valve 26 through a tube 34. This air is piloted through the air valve 26 and the tubes 27 and 30 to move the piston 32 of the air cylinder 31. Supply air streams are respectively delivered to Schmitt trigger 17, flip-flop 22, the flip-flop 25 through tubes 35, 36 and 37 from a source of compressed air 40 which may be in the neighborhood of 15 p.s.i. A tube 41 delivers control bias compressed air from the air supply 40 through a needle valve 42 to the Schmitt trigger.

Schmitt trigger 17 is preferably of conventional design. A suitable Schmitt trigger may be purchased under catalog No. FD 2812-2-2211 from the Fluidic Products Department of Corning Glass Works, Bradford, Pa. The described Schmitt trigger includes three cascade proportional amplifiers, a flip-flop, and a Nor gate in one monolithic block consisting of five plates. The signal input to the input proportional amplifier is amplified in three stages and is delivered to the flip-flop to operate the flip-flop. The output of the flip-flop is connected to the NOR gate to provide a switch gain and to provide a discrete output that is load insensitive. The input proportional amplifier portion of the Schmitt trigger 17 which is designated 43 is illustrated in FIGURES 2 and 3. Proportional amplifier 43 includes a signal input port 44; a control bias port 45 and a supply stream port 46 through which air is respectively supplied through tubes 16, 41 and 35. Supply stream air is delivered through the port 46 into a chamber 47 which is divided at a down stream point into a pair of diverging passageways 50 and 51. Signal input port 44 and control bias port 45 are in axial alignment and the axis common to both ports passes through the axis of the supply stream port 46 and is normal thereto.

With this porting arrangment, signal air delivered through the port 44 will impinge on one side of the supply stream air being delivered through the port 46 and control bias air being delivered through the port 45 will impinge on the supply stream air directly on the opposite side.

Power flip-flop 22 is also a commercially available item that may be obtained from the same source as Schmitt trigger 17 under catalog No. FD 2-4-3595. Pilot air valve 26 and integrally connected flip-flop 25 may also be purchased from the same source under the name "FLICR" valve catalog No. 190551. The valve of catalog No. 190551, however, normally comes with an integral Nor gate instead of the illustrated flip-flop and the flip-flop 25 is substituted for the Nor gate as an option.

OPERATION

After a can 12 has been placed in the chamber 11 and the chamber sealed by the movable suction head in the usual manner, air pressure is directed into the can through the tube 15. Any leakage that occurs either through the seams or walls of the can or through the juncture of the mouth rim of the can and rubber pad 14 will be delivered through the tube 16 into the signal port 44 of the input proportional amplifier 43 of the Schmitt trigger 17. Usually any leakage between the rim defining the can mouth and the rubber pad is very small but nevertheless in prior art machines employing a diaphragm or bellows type sensor, the diaphragm or bellows would be slightly flexed during the testing of each can due to this leakage. Such constant flexing was undesirable as it tended to shorten the life of the diaphragm or bellows.

Normally the supply air stream is divided up approximately equally in the passageways 50 and 51, but, as the signal air stream delivered through the tube 16 increases due to a leak in the can, the supply air stream will be diverted by impingement of the signal air stream thereon so as to have more thereof diverted into the passageway 51 and less diverted into the passageway 50 than previously. When the amount of air diverted into the passageway 51 reaches the level necessary to effect the triggering of the Schmitt trigger 17, it will result in air pressure being transmitted through the output tube 20 from the Schmitt trigger to the power flip-flop 22. This will cause the flip-flop 22 to change state, and, as a result, a signal in the form of air under pressure will be delivered through the output tube 24 of the flip-flop 22 to the flip-flop 25. The signal received via the tube 24 will cause the flip-flop 25 to change state with the effect that the changed output of the flip-flop 25 which is directed to the pilot air valve 26 causes the pilot air valve 26 to change state and direct compressed air through the tube 27 to the air cylinder 31 so as to drive the piston 32 thereof downwardly to set a reject mechanism for subsequent disposal of the detected leaking can in the test chamber 11.

By means of the needle valve 42 or other suitable flow control means through which control bias air is delivered into the control bias port 45 of the input proportional amplifier 43, it is possible to adjust the Schmitt trigger to be fired only when a predetermined amount of leakage air is being delivered into the signal input port 44. Since the Schmitt trigger is very sensitive, in the absence of control bias air flow through the needle valve 42, it might be caused to be triggered by any small air flow as a result of leakage between the rubber pad 14 and the rim of the can mouth or by a cam having a very slight leak not sufficiently great to render the can unacceptable. By opening the needle valve 42, the control bias air stream flowing through the control bias port 45 becomes stronger and acts to divert the supply air stream so that more of the supply air stream ends up in the passageway 50 and less in the passageway 51. As the needle valve is opened, the leakage signal air must become greater and greater to overcome the resulting bias and direct sufficient of the supply air stream into the passageway 51 to fire the Schmitt trigger for rejecting a defectively leaky can. The sensitivity of the apparatus is thus very easily controlled by means of the needle valve 42.

Upon removing the can 12 from the test chamber 11, the tube 16 will be subject to normal atmospheric pressure and the Schmitt trigger will return to its normal condition when no air is flowing through the signal input port 44 in which condition supply stream air flow is divided into the passageways 50 and 51 as set by the bias air flow through the port 45. When the Schmitt trigger is in its normal untriggered state, the supply of air through the output tube 20 thereof is terminated. Output air therefrom is instead supplied through the output tube 21 to the flip-flop 22. This causes the flip-flop 22 to change state which in turn causes the termination of output air being delivered therefrom through the tube 24 and causes output air being instead delivered therefrom through the output tube 23 to the flip-flop 25. The air flow signal through the tube 23 to the flip-flop 25 results in the flip-flop changing state which in turn acts as a signal to the pilot air valve causing it to be conditioned to direct compressed air through the tube 30 to the air cylinder 31 and terminate the delivery of compressed air through the tube 27. The air delivered through the tube 30 drives the piston 32 upwardly to a position where the can reject device will not be actuated thereby. The fluidic circuit will remain in this condition until such time as a defectively leaky can is under test in the chamber 11 having sufficient leakage that when the leakage is delivered into the signal input port 44 it has sufficient force to divert the supply air stream against the effect of the control bias air stream sufficiently into the passageway 51 to reach the trigger level of the Schmitt trigger circuit.

One advantage of the preferred form of apparatus 10 is that the only moving part therein is the piston 32 and associated piston rod which is not shown. Another advantage is that the circuit is completely fluidic with there being no conversion from fluidic to electrical signals. The completely fluidic pilot air valve is capable of operating at a much higher cyclical rate than the solenoid of the prior art devices which results in the apparatus 10 being capable of higher operating speeds than the prior art has been able to provide. Also, since there are no moving parts in the system for controlling the position of the piston 32, once the needle valve 42 has been set at the desired trigger level, the apparatus will work indefinitely without any maintenance.

DESCRIPTION OF AN ALTERNATE EMBODIMENT

An alternate form of the invention generally designated by the numeral 52 is depicted in FIGURE 4. This form of the invention makes use of the principal feature of interacting fluid streams but otherwise employs most of the components of a commonly used prior art detecting system and has the advantage that it can thus be used as a conversion kit to improve the operation of the prior art machines without going to any great expense.

The alternate apparatus 52 includes a tube 53 connected to the test chamber of the usual testing machine which corresponds to the tube 16 of the preferred apparatus 10. The other end of the tube 53 connects into a turbulence amplifier generally indicated at 54. Turbulence amplifier 54 includes a body 55 defining a hollow chamber 56 therein. Signal air is delivered from the chamber 11 through the tube 53 into the chamber 56 in a direction normal to the longitudinal axis of the chamber configuration.

A tube 57 protrudes through an end of the body 55 in axial alignment with the chamber 56 and delivers a constant supply air stream therethrough from an air pressure supply 60. The supply air stream passes axially through the chamber 56 in laminar flow form and enters a collector tube 61 which is in axial alignment with the portion of the tube 57 that projects into the chamber 56. Since a major portion of the laminar flow air stream from the tube 57 initially enters through the end of the tube 61 the pressure in the tube 61 increased so as to extend the bellows 63 connected to an opposite end of the tube 61. When so extended, the bellows 63 holds down an operating button 64 of a switch 65 to maintain the switch contacts open. A solenoid 66 of a solenoid valve 67 is supplied with electrical energy from a suitable source via the conductors 70, 71 and 72 and the switch 65. A compressed air supply 73 delivers compressed air through a tube 74 to the solenoid valve 67. Solenoid valve 67 is of the type having a spring biased air-flow control spool such that when the solenoid 66 is not energized the spool will be positioned by the spring to direct air to the rod end of the associated air cylinder 75 forcing the piston 76 thereof all the way to the right end of the air cylinder where it will remain until the solenoid 66 is energized.

A needle valve 77 is interposed in a tube 80 connecting with a tube 53 to bleed off some of the signal air flowing through the tube 53 and acts as a sensitivity adjustment. Openings are provided in the body 55 of the turbulence amplifier as indicated at 81, through which excess air may leave the chamber 56.

OPERATION

During operation of the alternate form of the invention 52 a constant stream of supply air is delivered from the tube 57 in laminar flow form which is directed against the open end of the collector tube 61 in the chamber 56 to apply air pressure to the bellows 63 maintaining the switch 65 open, and, as a consequence, the piston 76 at the right end of the air cylinder 75 as long as acceptable cans are being sequentially tested.

However, if an unacceptably leaky can is now present in the chamber 11, air flow through the tube 53 will increase from either zero or a minimum air flow to a sufficient level that when directed against the supply air stream, as illustrated in FIGURE 5, will break the supply air stream up into turbulent flow. When this occurs, the air in the bellows 63 and tube 61 will flow back out into the chamber 56 and the bellows will collapse releasing the operating button 64 of the switch 65 causing the switch contacts to close. The closing of the switch contacts is effective to energize the solenoid 66 which repositions the air-flow control spool of the solenoid control valve 67 causing compressed air to be directed into the head end of the air cylinder 75 to drive the piston 76 leftwardly in which position it sets a reject mechanism for subsequent rejection of the defectively leaky can in a manner well known to the art. When the defective can is removed from the test chamber 11, air will cease to flow through the tube 53 into the turbulence amplifier 54 and the supply air stream will again become laminar with a large percentage of the air flowing directly into the end of the tube 61 in the chamber 56 to build up air pressure in the tubes 61 and bellows 63. This expands the bellows causing it to again come into contact with the operating button 64 depressing the button and opening the switch 65. The opening of switch 65 results in the piston 76 being repositioned by the solenoid valve 67 to the right end of the air cylinder 75 where it will remain until the next defectively leaky can is encountered.

By means of the air bleed-off needle valve 77 or other equivalent flow control means, the apparatus 52 may be adjusted so as to detect only grossly leaking cans or cans having extremely fine leaks that are barely detectable with prior art devices.

An advantage of the apparatus 52 over prior art devices is that the bellows sensor 63 or movable diaphragm type sensor which may be resorted to in place of the bellows type sensor is not constantly flexed during the testing of each can, but is only caused to move from its normal expanded position or deflected position when a defectively leaky can is encountered. This greatly extends the life of the bellows or diaphragm. Another advantage is the great sensitivity that can be achieved through the use of the turbulence amplifier which is a very sensitive type of fluidic amplifier. A still further advantage is the ease with which the apparatus may be adjusted for sensitivity by merely adjusting the air bleed-off needle valve which gives very accurate control that is not prone to get out of adjustment.

Like the preferred form of apparatus 10, the apparatus 52 is entirely made up of components readily purchaseable on the market from a number of sources of supply. For example, the turbulence amplifier illustrated is of the type covered by U.S. Patent No. 3,234,955 and may be obtained from Howie Corporation, Fluidic Division, located in Norristown, Pa.

I claim:

1. Apparatus for testing containers such as cans for leaks comprising:
   means for subjecting a container to differential fluid pressure,
   a proportional amplifier having a body defining a chamber, a supply stream entrance through which a supply fluid stream passes into said chamber, a signal input entrance arranged to direct a leaky container signal stream to interact with said supply fluid stream in said chamber causing said supply stream to be modified by said signal stream,
   means for delivering fluid leaking through said container in the form of a leaky container signal stream to said signal input entrance,
   a fluidic Schmitt trigger having said proportional amplifier as its first stage, and
   a fluidically operated pilot valve connected to the output of said Schmitt trigger whereby said Schmitt trigger controls the operation of said pilot valve and a fluid cylinder is connected to said pilot valve to be operated by said pilot valve whereby said fluid cylinder operates a reject device in accordance with fluidic output signals transmitted by said Schmitt trigger to said pilot valve.

2. The apparatus as set forth in claim 1 in which said input proportional amplifier has,
   a control bias input entrance arranged to direct a control stream into said chamber in such a way as to oppose the modification of said supply stream by said leaky container signal stream whereby the signal strength level of said leaky container signal stream necessary to fire the Schmitt trigger is varied by the intensity level of said control stream.

3. The apparatus as set forth in claim 2 having in addition:
   an adjustable valve for fine control of the strength of said control stream passing through said input entrance whereby the strength of said control stream may be varied to cause con-commitant variations in the intensity level of said leaky container signal stream necessary before it has the strength to fire the Schmitt trigger.

References Cited

UNITED STATES PATENTS

| | | | |
|---|---|---|---|
| 1,861,542 | 6/1932 | McDonald et al. | 73—45.2 |
| 2,645,117 | 7/1953 | Bendix et al. | 73—49.2 |
| 2,985,008 | 5/1961 | Renard | 73—45.2 |
| 3,198,004 | 8/1965 | Roberts et al. | 73—45.1 |
| 3,234,955 | 2/1966 | Auger | 137—81.5 |
| 3,260,271 | 7/1966 | Katz | 137—81.5 XR |
| 3,266,510 | 8/1966 | Wadey | 137—81.5 |
| 3,339,571 | 9/1967 | Hatch | 137—81.5 |
| 3,362,421 | 1/1968 | Schaffer | 137—81.5 |
| 3,373,760 | 3/1968 | Adams et al. | 137—81.5 |

LOUIS R. PRINCE, *Primary Examiner.*

J. NOLTON, *Assistant Examiner.*

U.S. Cl. X.R.

73—49.2; 137—81.5